Feb. 8, 1927.
A. W. HAINES
BELT SHIFTER
Filed July 28, 1922
1,616,657
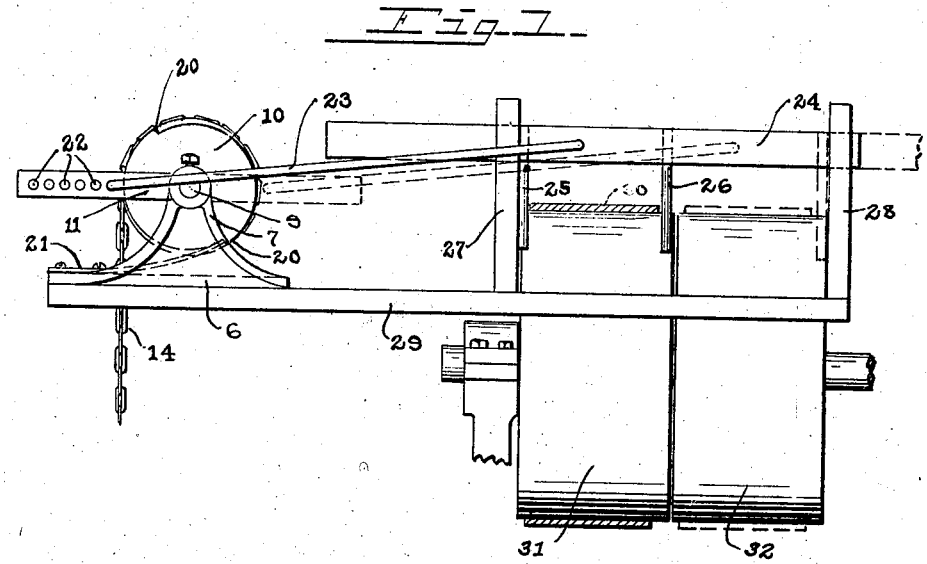
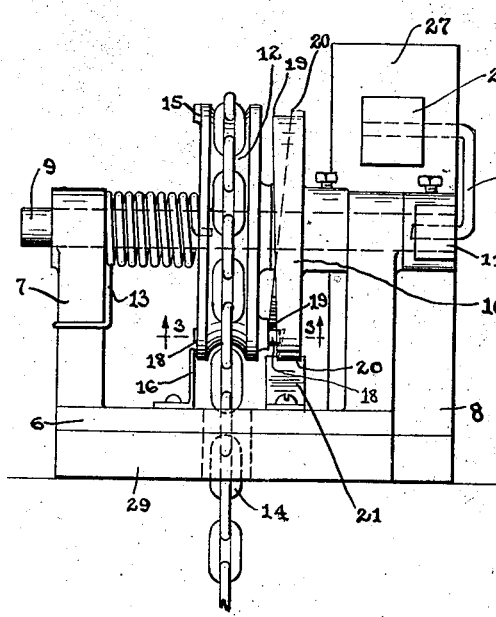
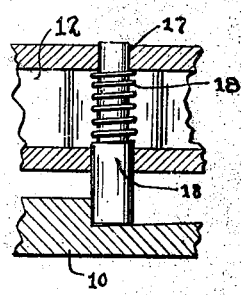
INVENTOR.
August William Haines
BY
Morsell & Keeney
ATTORNEYS.

Patented Feb. 8, 1927.

1,616,657

UNITED STATES PATENT OFFICE.

AUGUST WILLIAM HAINES, OF MILWAUKEE, WISCONSIN, ASSIGNOR OF ONE-HALF TO GEORGE BAUER, OF MILWAUKEE, WISCONSIN.

BELT SHIFTER.

Application filed July 28, 1922. Serial No. 578,259.

This invention relates to improvements in belt shifting devices.

It is one of the objects of the present invention to provide a device which will easily and quickly shift a belt from one pulley to another.

A further object of the invention is to provide a belt shifter which has a positive means for controlling the movement of the shifting mechanism and is easily and conveniently operated.

A further object of the invention is to provide a belt shifter which is of simple construction, is strong and durable and is well adapted for the purposes described.

With the above and other objects in view, the invention consists of the improved belt shifter and its parts and combinations as set forth in the claims, and all equivalents thereof.

In the accompanying drawing in which the same reference characters indicate the same parts in all of the views:

Fig. 1 is a side view of two pulleys and the belt shifting mechanism in connection therewith;

Fig. 2 is an enlarged view of the belt shifter, but at right angles to Fig. 1; and Fig. 3 is a cross-sectional detail view taken on line 3—3 of Fig. 2 and on a larger scale.

Referring to the drawing, the numeral 6 indicates a frame having a pair of upwardly extending bearings 7 and 8 in which a revoluble shaft 9 is journaled. Said shaft carries a shouldered cam 10 fast thereon, an arm 11, a loose grooved pulley 12, and a coiled spring 13 having one of its extremities secured to bearing 7, and the other to pulley 12. Pulley 12 has secured to and partly surrounding it a chain 14 which when pulled, will give pulley 12 a limited rotation, the rotation being limited by lug 15 carried on said pulley and stop 16 secured to frame 6. Spring 13 retrieves said pulley to its normal position. Pulley 12 is further provided with a bore 17 near its rim having therein a headed pin 18 carrying a coiled spring 18′ to yieldingly hold the pin in its outer position and in which position it bears against the face cams 19. The face cams 19 of the shouldered member 10 are engaged by the pin 18 and the said member 10 is also provided with a pair of inclined, semi-peripherially extending, outwardly tapering teeth 20 along the faces of which the dog 21 rides, and when in engagement with one of said shoulders, will prevent any retrograde movement of said cam member. Arm 11 mounted fast on the extremity of shaft 9 has a plurality of apertures 22 thru one of which the angular end of a connecting link 23 is secured. The outer angular extremity of the connecting link 23 is journaled in a slidable shifter 24 provided with a pair of downwardly depending pins 25 and 26. Said shifter moves through upright guides 27 and 28 of frame 29 and the pins permit a belt 30 passing over a loose pulley 31 to move therebetween and when the mechanism is operated, will move said belt from the loose pulley 31 to a fast pulley 32 and vice versa.

In operation, chain 14 is pulled downwardly by the operator until the movement of grooved pulley 10 is stopped by lug 15 and stop 16. Cam member 10 rotates with it to this point by means of the engagement of pin 18 and a shoulder of tooth 19. During this movement, arm 11 has also been swung approximately one-half of a revolution and shifter 24, connected thereto, is moved and the belt, between pins 25 and 26, is also moved from one of the pulleys to the other. The dotted lines in Fig. 1 illustrate the movement of members 11, 23, 24, and 30. The operator next releases chain 14 and grooved pulley 10 is retrieved by means of coiled spring 13, pin 18 riding back over the inclined faces of cams 19 until a shoulder is reached. During this movement dog 21 checks the cam member from retrograde movement.

When it is desired to reshift the belt, chain 14 is again pulled and the movement of the parts is the same except that members 11, 23, 24 and 30 return from the positions shown in dotted lines in Fig. 1 to their normal positions.

The amount of travel of shifter 24 can be regulated by moving the extremity of connecting link 23 into any of the various apertures 22.

From the foregoing description it will be seen that the belt shifter is of very simple construction and is well adapted for the purposes described.

What I claim as my invention is:

A belt shifting device, comprising a belt engaging member, a connecting link having one end portion secured to the belt engaging member, a rotary cam member for reciprocating the belt engaging member and having double cam surfaces, means engaging said cam surfaces for preventing retrograde movement of the rotary cam, an arm revoluble with the rotary cam member and connected to the other end portion of said link, a retrieved member, a yieldably mounted pin projecting transversely from one face of the retrieved member, and engaging the cam surfaces of the rotary member to intermittently rotate said member, and means for actuating the retrieved member.

In testimony whereof, I affix my signature.

AUGUST WILLIAM HAINES.